INVENTOR
E. A. J. MARCATILI

United States Patent Office 3,674,337
Patented July 4, 1972

3,674,337
BEAM COUPLING TO AND FROM THIN FILM WAVEGUIDE
Enrique Alfredo Jose Marcatili, Rumson, N.J., assignor to Bell Telephone Laboratories, Incorporated, Murray Hill, N.J.
Filed Dec. 7, 1970, Ser. No. 95,690
Int. Cl. G02b 5/14; H01p 3/00
U.S. Cl. 350—96 WG
4 Claims

ABSTRACT OF THE DISCLOSURE

Harmful effects associated with imperfections at the end of a thin film optical waveguide are avoided in a coupling arrangement in which the dielectric waveguide strip is terminated inside the substrate. The exciting beam is directed towards the end of the guide from within the substrate at a preferred angle of incidence. The optimum beam angle is also specified. Excitation efficiencies of the order of 90–97 percent are predicted.

This invention relates to arrangements for coupling optical waves into and out of thin film dielectric waveguides.

BACKGROUND OF THE INVENTION

A communication system using infrared, visible and ultraviolet waves (hereinafter referred to as optical waves) as the carrier of information requires, as do its lower frequency counterparts, signal processing means at intermediate repeater locations along the transmission medium and at the receiver end of the system. For this purpose, it has been suggested to employ integrated optical circuits comprising a thin dielectric guiding strip embedded in a surface of a dielectric substrate of slightly lower refractive index. (See, for example, an article by E. A. J. Marcatili entitled "Dielectric Rectangular Waveguide and Directional Coupler for Integrated Optics," published in the September 1969 issue of the Bell System Technical Journal, pages 2071 through 2102 and "Integrated Optics: An Introduction," ibid; pages 2059 through 2070.) Such a system requires an efficient and simple means for coupling optical waves into and out of the thin guiding strip.

In an article entitled "Modes of Propagating Light Waves in Thin Deposited Semiconductor Films," by P. K. Tien et al., published in the May 1, 1969 issue of Applied Physics Letters, pages 291–294, there is described a coupling arrangement which utilizes the evanescent field outside of a high index prism to couple a beam of optical wave energy to one of the guided modes of a thin film waveguide. While this coupling technique is suitable for wide thin film guides, it is much less adequate for coupling to the very narrow light guides that are more likely to be used in integrated optical circuits.

An alternate method of exciting the guided modes of dielectric waveguides is by shining the optical beam directly at the end of the guide. It has been shown theoretically that the conversion efficiency obtainable by this method is higher than that of the prism coupler. Indeed, light injection by direct excitation with an optical beam is usually employed with cladded round optical fibers. The application of this method to the thin film dielectric waveguides used with integrated optical circuits, however, has been much less successful due to the fact that the ends of these guides are of much poorer optical quality.

It is, accordingly, the broad object of the present invention to couple efficiently to and from narrow, thin film optical waveguides.

SUMMARY OF THE INVENTION

In accordance with the present invention, the harmful effects associated with the imperfections at the end of a thin film optical waveguide are avoided in a coupling arrangement in which the dielectric waveguide strip is terminated inside the substrate. The exciting beam is directed towards the end of the guiding strip from within the substrate at a preferred angle of incidence $\alpha_0$ where $0 < \alpha_0 < 10°$. The optimum beam angle $\theta_0$ is also specified. Coupling efficiencies of between 90 to 97 percent are realized.

It is an advantage of the present invention that the coupling arrangement is independent of beam size. In particular, it is highly efficient when used with thin film waveguides whose cross-sectional dimensions are less than ten wavelengths.

These and other objects and advantages, the nature of the present invention, and its various features, will appear more fully upon consideration of the illustrative embodiment now to be described in detail in connection with the accompanying drawings.

DETAILED DESCRIPTION

Figure 1:
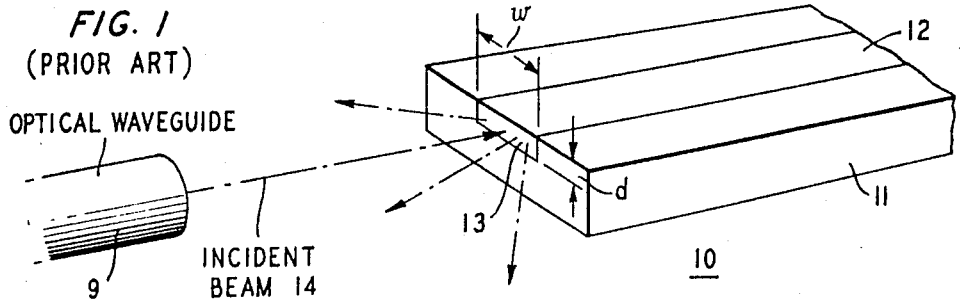
FIG. 1 shows an end portion of a prior art thin film, dielectric waveguide.

Referring to the drawings, FIG. 1 shows a portion of an electromagnetic wave transmission system. In particular, there is shown the adjacent end sections of two dissimilar waveguides 9 and 10. One of the waveguides 10 is a thin film dielectric waveguide comprising a low-loss dielectric substrate 11 in which there is partially embedded a low-loss guiding strip 12 of slightly higher refractive index. In an optical waveguide, strip 12 has a depth $d$ and a width $w$ of the order of a few microns. While, in general, strip 12 can be totally embedded within substrate 11, the present invention is of particular interest in connection with integrated optical circuitry in which strip 12 is produced by diffusion, by sputtering or by an evaporation technique and, as such, is only partially embedded in the substrate.

Waveguide 9 can be any other type of beam waveguide such as, for example, the gas lens waveguide described by D. Marcuse in a paper entitled "Properties of Periodic Gas Lenses," published in the November 1965 issue of the Bell System Technical Journal. Typically the beam in such a waveguide has cross-sectional dimensions of the order of thousands of wavelengths. Regardless of the specifics of waveguide 9, however, it is the object of the present invention to couple wave energy most efficiently between these two-different waveguiding structures.

It is apparent that in order to couple efficiently into guide 12, the end of the strip 13 must be optically polished after its deposition. As a practical matter, however, even if an effort is made to polish the guide end, it is virtually impossible to make the strip end, which is only a few microns thick, and which is located at the upper edge of the substrate, optically flat. More generally, it is optically coarse such that is significant portion of an incident beam, represented by arrow 14, is scattered as it impinges upon end 13 of strip 12.

Figure 2:
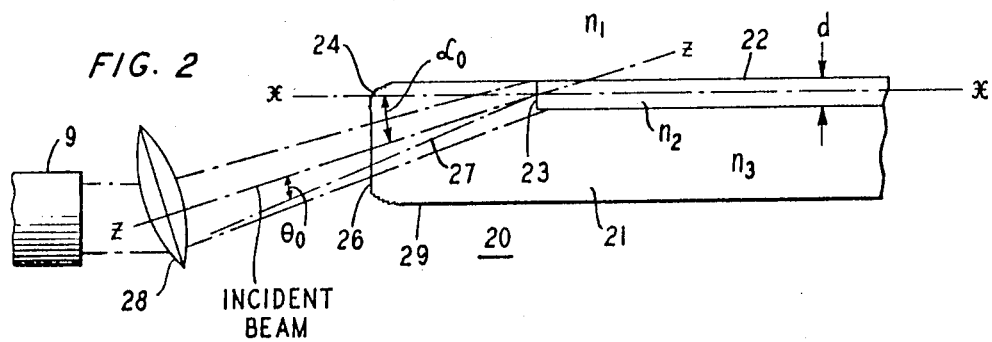
FIG. 2 shows an end portion of a thin film, dielectric waveguide in accordance with the present invention.

The difficulty described above is avoided, in accordance with the invention, by terminating the guiding strip 12 before it reaches the end of the substrate. When this is done, it can be shown that optimum coupling is obtained when a beam of prescribed width is incident at a slight angle to the longitudinal axis of the guiding strip. This makes it possible to direct the beam onto the strip end through the substrate by passing it through the bottom of the substrate or by passing it through the center portion of the end of the substrate and away from its optically rough edges. This latter arrangement is illustrated in FIG. 2, which shows a longitudinal section of an end portion of a thin film, dielectric waveguide 20, in accordance with the present invention, comprising a guiding strip 22 partially embedded in a substrate 21. Unlike the guide shown in FIG. 1, however, strip 22 terminates inside substrate 21 so that the strip end 23 is in contact with the substrate whose refractive index $n_3$ differs by only a percent or so from the refractive index $n_2$ of the strip. This being the case, any coarseness at the strip end is of negligble consequence. The end 26 of the substrate, on the other hand, being much larger can be made optically smooth over most of its surface. As a consequence, the beam, which is incident upon the strip end at a slight angle, can be readily directed into the guide through the optically smooth central portion of the substrate end 26 and away from its optically rough upper edge 24. Alternatively, the beam can be directed through the substrate bottom 29.

The beam is coupled between waveguide 20 and waveguide 9 by means of beam focusing and directing means, such as a lens 28, or combination of lenses, disposed in the wavepath between the two guides at an angle $\alpha_0$ to the strip. When coupling from guide 9 to guide 20, it is the function of lens 28 to focus the incident beam onto the end portion of strip 22 and to impart to the beam the optimum cross-sectional shape and the optimum direction. Conversely, when coupling from guide 20 to guide 9, it is the function of lens 20 to match the beam radiated at the end of strip 22 to guide 9. Being a reciprocal element, both these conditions are satisfied simultaneously, as will be evident from the discussion hereinbelow. It should be noted that while lens 28 is shown as a separate element, it can be incorporated into and made a part of either guide 9 or guide 20. As an example, the end 26 of substrate 21 can be shaped to produce the desired focusing and directing.

In order to define the beam that will couple most efficiently to waveguide 20, the problem was reversed and a study was made of the radiation pattern that is produced by the guided mode of interest upon reaching strip end 23. Having thus determined the radiation pattern, the optimum width and direction of an incident beam, having a Gaussian distribution, was determined by matching this radiation pattern as closely as possible to the incident beam.

In the instant case, the radiation pattern is complicated by the asymmetric nature of the structure and, in particular, by the presence of the dielectric-air interface (the $n_1$–$n_3$ interface) adjacent to strip end 23. Since a substantial portion of the radiation field is reflected at this interface, the vertical beam pattern is modified thereby. The horizontal pattern, on the other hand, is symmetrical about the vertical plane. Accordingly, the optimum beam axis lies in the vertical plane of the guide (i.e., the plane through the center of strip 22 and parallel to the $d$ dimension) but at an angle to the horizontal plane of the guide (i.e., the plane through the center of strip 22 and perpendicular to the $d$ dimension).

To simplify the problem, the substrate and strip are assumed to extend infinitely in the horizontal dimension and, for this case, the beam is focused by a cylindrical lens 28 into a wedge of finite height and infinite width. In a practical case, the lens system focuses the incident beam into an elliptical cross section which, typically, has its smaller dimension in the vertical plane.

Designating the beam axis $z$—$z$, and the longitudinal guide axis $x$—$x$, the optimum angle of incidence $\alpha_0$ is the angle the beam axis makes with the longitudinal guide axis for maximum coupling. Also identified in the figure is the optimum half-width angle $\theta_0$. For a typical laser beam having a Gaussian beam distribution, the half-width angle is the angle, measured at the focal point, that the beam axis makes with a line 27 connecting the focal point to the far field, $(1/e)$-intensity point.

Figure 3:
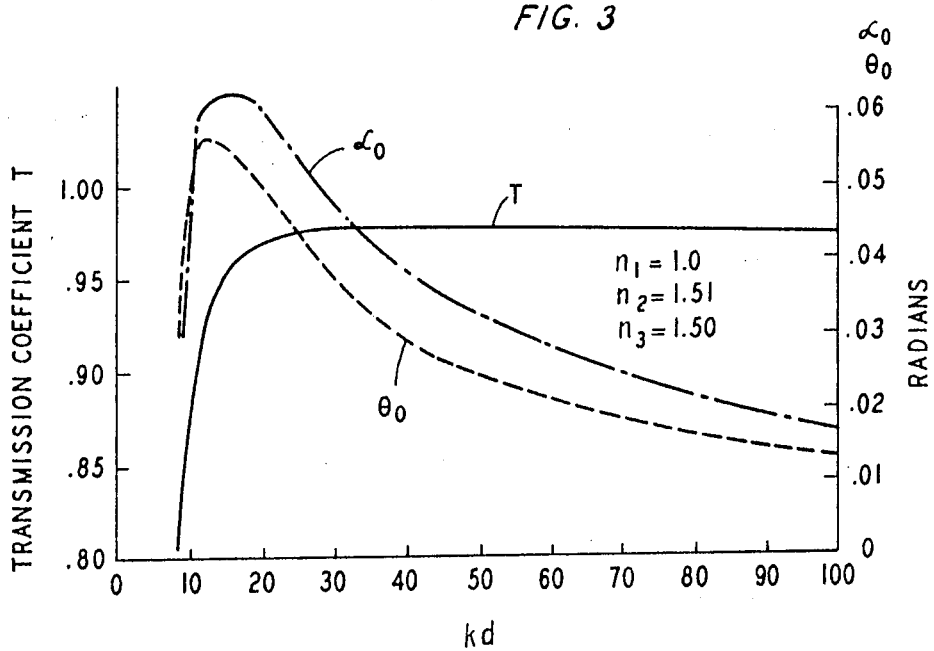
FIG. 3 is a graphic representation showing the optimum beam angle and beam width for different ratios of guide width to signal wavelength.

A solution of the problem, as outlined above, results in a rather complicated equation which relates the transmission coefficient T to the physical parameters of the guide and the optimum beam direction $\alpha_0$ and half-width angle $\theta_0$. Evaluating this equation numerically for a particular waveguide, the optimum values of $\alpha_0$ and $\theta_0$ were obtained, and are plotted in FIG. 3 as a function of $kd$; where $k = 2\pi/\lambda$; $\lambda$ is the wavelength of the signal in air ($n_1 = 1$), and $d$ is the strip thickness. Also shown is a plot of the transmission coefficient T, which defines the percentage of the free space beam coupled into the guide. Thus, for example, for a value of $kd$ equal to 20, the optimum beam angle $\alpha_0$ is 0.06 radian and the optimum half-beam width $\theta_0$ is 0.05 radian. The resulting coupling efficiency T is of the order of 95 percent.

Approximate expressions for $\alpha_0$ and $\theta_0$ are given by $$\alpha_0 \approx \frac{\pi}{n_2 kd}\left[1 - \frac{(kd)_0}{kd}\right]^{1/2}\left[1 - \frac{1}{kd(n_2^2 - n_3^2)^{1/2}}\right] \quad (1)$$

where $$(kd)_0 = \left[\frac{\left(\frac{\pi}{2}\right)^2 - \pi\left(\frac{n_2^2 - n_3^2}{n_1^2 - 1}\right)^{1/2}}{n_2^2 - n_3^2}\right]^{1/2} \quad (2)$$

and $$\theta_0 \approx \frac{2}{n_3 kd\left[1 + \frac{1}{d(\beta_0^2 - n_3^2 k^2)^{1/2}}\right]} \quad (3)$$

where $$n_1 = 1$$

$$\frac{n_2 - n_3}{n_2} < 0.10$$

$\beta_0$ is the guide phase constant.

It will be recognized that the analysis given above necessarily assumes a number of idealized conditions. For example, the strip is assumed to be of uniform thickness $d$, and is assumed to end abruptly at a precise point 23 within the substrate. More likely, however, the end will gradually taper off over some finite distance so that the strip end will constitute a region of varying refractive index and thickness. Similarly, the width $w$ of the strip will not be much different than its thickness $d$ rather than infinite, as was assumed for purposes of discussion. Accordingly, the curves for $\alpha_0$ and $\theta_0$, and the approximate expressions given by Equations 1 and 3 are only intended to be first approximations to the optimum beam direction and size. In a practical case, the beam would be directed and focused, in the first instance, as indicated by either the curves or Equations 1 and 3, and a final adjustment made experimentally. In general, the range of values for $\alpha_0$ and $\theta_0$ can be expected to lie within the range $$0 < \alpha_0 < 10°$$
$$0 < \theta_0 < 10°$$

Similarly, the optimum beam half-width angle, $\theta_h$, in the plane orthogonal to the plane of $\theta_0$, is given approximately by $$\theta_h \approx \frac{2\lambda}{\pi n_3 w} \quad (4)$$

where $w$ is the strip width. In practice, this will also be within the general range $$0 < \theta_h < 10°$$

In FIG. 2 the beam is shown passing through the substrate end 26 without being refracted. Since there will, of course, be some refraction due to the difference in refractive index between the substrate $n_3$, and the surrounding medium $n_1$, the beam angle outside the substrate will be slightly different than the beam angle within the substrate. The curves and ranges given above relate to the beam within the substrate.

The discussion thus far has concerned itself with means for coupling into a thin film, dielectric waveguide. It will be recognized that the same conditions apply when coupling out of such a waveguide. That is, for optimum coupling from a thin film guide to another waveguiding system, the guiding strip of the former is terminated within the substrate and the focusing and directing means located at an angle $\alpha_0$ to the guiding strip. The latter is designed to accepted a radiated beam having a half-width angle $\theta_0$ and to direct it into the other waveguide.

I claim:

1. An electromagnetic wave beam coupling arrangement for coupling optical wave energy between two dissimilar optical waveguides, one of which comprises:
   a low-loss dielectric strip partially embedded in a surface of a low-loss dielectric substrate of smaller refractive index;
   said strip terminating within said substrate; and
   means for focusing and directing an optical beam radiated by the other of said waveguides onto said one waveguide through said substrate at an angle $\alpha_0$ to said guiding strip, where $0 < \alpha_0 < 10°$.

2. An electromagnetic wave beam coupling arrangement including:
   a dielectric waveguide comprising an elongated, low-loss dielectric strip of thickness $d$ and refractive index $n_2$ partially embedded in a surface of a low-loss dielectric substrate of refractive index $n_3$ less than $n_2$;
   said strip terminating within said substrate; and
   means for focusing and directing a Gaussian beam, having a half-width angle $\theta_n$ in a plane perpendicular to said surface, onto the end of said strip through said substrate at an angle $\alpha_0$ to said strip, where $0 < \theta_0 < 10°$ and $0 < \alpha_0 < 10°$.

3. The arrangement according to claim 2 wherein $\theta_0$ and $\alpha_0$ are given approximately by $$\alpha_0 \approx \frac{\pi}{n_2 k d}\left[1 - \frac{(kd)_0}{kd}\right]^{1/2}\left[1 - \frac{1}{kd(n_2^2 - n_3^2)^{1/2}}\right]$$

$$\theta_0 \approx \frac{2}{n_3 k d\left[1 + \frac{1}{d(\beta_0^2 - n_3^2 k^2)^{1/2}}\right]}$$

where
   $\lambda$ is the free space wavelength of said beam;
   $d$ is the thickness of said strip;
   $k = 2\pi/\lambda$;
   $\beta_0$ is the phase constant of the waveguide;
   $n_1$, the refractive index of the medium surrounding said waveguide, is equal to unity;
and $$(kd)_0 = \left[\frac{\left(\frac{\pi}{2}\right)^2 - \pi\left(\frac{n_2^2 - n_3^2}{n_2^2 - 1}\right)^{1/2}}{n_2^2 - n_3^2}\right]^{1/2}$$

4. The arrangement according to claim 2 wherein the beam half-width angle $\theta_h$ in the plane orthogonal to the plane of $\theta_0$ is given approximately by $$\theta_h \approx \frac{2\lambda}{\pi n_3 w}$$

where $\lambda$ is the beam wavelength in air; and
$w$ is the strip width.

References Cited

UNITED STATES PATENTS 3,563,630   2/1971   Anderson et al. ___ 350—96 WG

OTHER REFERENCES

Dakss et al., "Generation of Surface Wave Networks by Optical Damage," IBM Technical Disclosure Bulletin, vol. 12, No. 11, April 1970, pp. 1942, 1943.

JOHN K. CORBIN, Primary Examiner